United States Patent [19]

Nishimura et al.

[11] 4,407,402

[45] Oct. 4, 1983

[54] FASTENER FEEDING APPARATUS

[75] Inventors: Masaru Nishimura; Osamu Shikata; Yoshikuni Ohtsuka, all of Ayabe, Japan

[73] Assignee: Nitto Seiko Co., Ltd., Kyoto, Japan

[21] Appl. No.: 227,388

[22] Filed: Jan. 22, 1981

[51] Int. Cl.³ .............................................. B65G 47/24
[52] U.S. Cl. ..................................... 198/389; 198/396
[58] Field of Search ............... 221/164, 165, 167, 161; 198/389, 396, 399

[56] References Cited

U.S. PATENT DOCUMENTS

| 1,080,996 | 12/1913 | Perkins | 221/161 |
| 1,180,903 | 4/1916 | Brennan | 221/165 |
| 1,597,439 | 8/1926 | Fagan et al. | 221/165 X |
| 3,346,095 | 10/1967 | Dixon | 198/389 |

Primary Examiner—Jeffrey V. Nase
Assistant Examiner—Dennis J. Williamson
Attorney, Agent, or Firm—Koda and Androlia

[57] ABSTRACT

A fastener feeding apparatus includes a hopper for the bulk storage of fasteners, an oscillating scoop plate body for scooping up the fasteners from the hopper and letting them slide down onto a vibrating chute rail and a spring biased exclusion plate which moves back and forth above the chute rail to return any improperly oriented fasteners back into the hopper.

11 Claims, 15 Drawing Figures

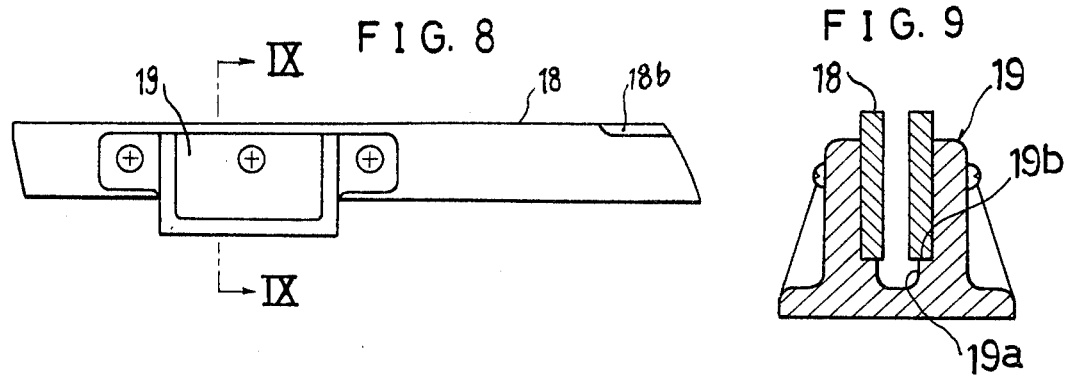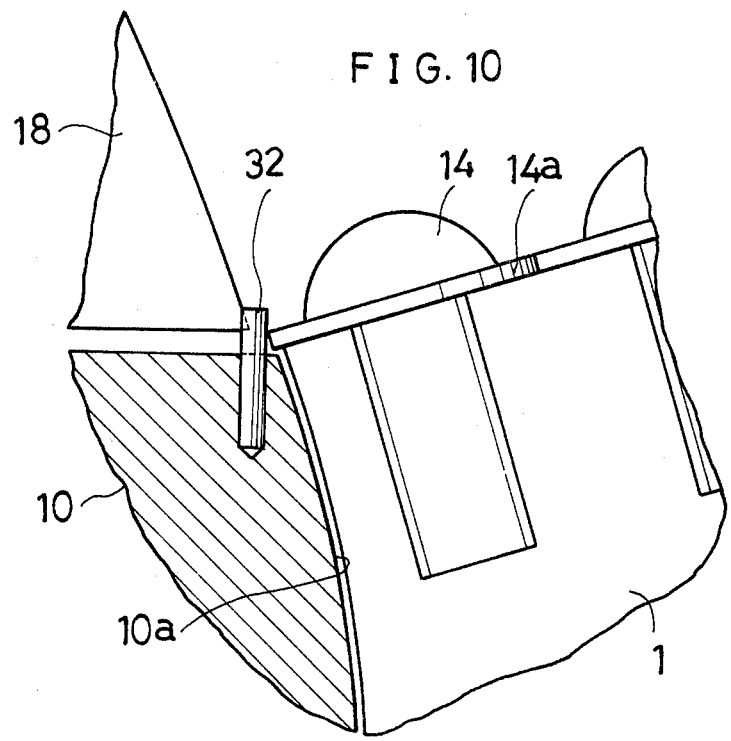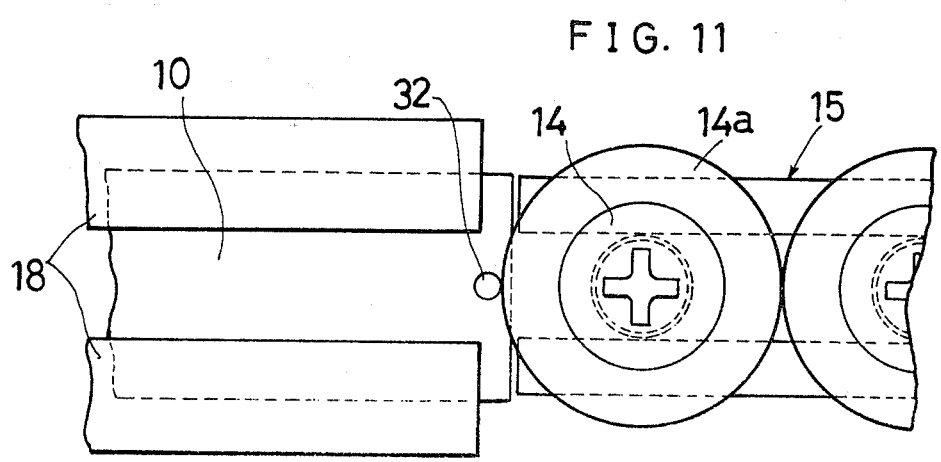

FASTENER FEEDING APPARATUS

BACKGROUND OF THE INVENTION

1. Field of the Invention

This invention relates to a fastener feeding apparatus and more particularly to an apparatus for scooping up, properly orienting, and feeding a plurality of fasteners which are stored in bulk form in a hopper.

2. Prior Art

In the case of fasteners such as screws, rivets, pins, or the like consisting of a head part and a leg part which are to be successively fed to an apparatus such as a single fastener dispensing unit from which they may be delivered one at a time to an automatic fastening tool such as an automatic screw driver, automatic riveter, automatic pin inserter tool, or the like, in the prior art, a plurality of such fasteners stored in bulk form in a hopper may be scooped up by a scooping plate pivotally moving up and down in a hopper and transferred to an obliquely supported chute rail. From the chute rail, the fasteners may be fed by gravity into a dispensing unit placed at the lower end of the chute rail. Such prior art apparatus is shown in Japanese patent publication No. 36392/79 and also in Japanese Utility Model publication No. 65185/79. However, such prior art fastener feeding apparatus has several drawbacks including the following: The fasteners being fed do not always point downward against the upper surface of the chute rail; also, their respective head parts may mutually overlap. Moreover, in the case of comparatively long fasteners, the leg part of the first fastener to be output and the leg part of a second fastener may both enter the dispensing unit simultaneously, causing a blockage of the entrance thereof and preventing any more fasteners from being dispensed. Furthermore, dust and oil may cling to the chute rail, preventing the fasteners from being properly fed. Further, when the fasteners having a short shank are fed by such an apparatus, if the adjustment to the fasteners is not made properly, the fasteners occassionally fall out. In other words, such an apparatus has a problem that it is unable to feed the fasteners securely.

In other prior art, such as is shown in Japanese patent application publication No. 2567/73, the fastener feeding apparatus is constructed in such a manner that a barrel rotatably supported on a base is provided with a scooping member therein for scooping up fasteners, said barrel and scooping member being caused to rotate by a motor. A generally horizontal conveyor rail which passes through the opening of the barrel is also provided. However, in such feeding apparatus, since the fasteners are scooped up by the rotating barrel, they are continuously being stirred up whenever the apparatus is in motion. As a result, the fasteners are easily scratched and stripped of their coatings. Moreover, as a powerful motor is required for rotating the barrel, the whole apparatus is relatively large. Furthermore, in the type of prior art described above, several of the thus scooped up fasteners may protrude upwards due to the mutual overlapping of their respective head parts and may be deposited on the chute rail in an inclined or overturned position, that is to say, in an disorderly or randomly oriented fashion. To return such randomly oriented fasteners to the hopper, there may be provided an excluding means in the form of an impeller such as is illustrated in Japanese patent publication No. 3776/69 which allows only properly oriented fasteners to pass through. By rotating the excluding impeller while the apparatus is in operation, the randomly oriented fasteners will be forced back into the hopper. However, in the process of excluding the improperly oriented fasteners, the surface of the fasteners may be scratched and the fasteners may be jammed into the space between the chute rail and the excluding impeller. Furthermore, the manufacture of such an including impeller is quite complicated.

SUMMARY OF THE INVENTION

Accordingly, it is a general object of the present invention to provide a fastener feeding apparatus by means of which properly oriented fasteners, that is to say, with the leg part of the fasteners always pointing vertically downward, may be fed to other apparatus such as a fastener dispensing unit.

It is another object of the present invention to provide a fastener feeding apparatus which prevents a washer or the like attached to a bolt or the head part of a pin or a rivet from being jammed into the space between the upper surface of a supporting plate extending within a hopper and the lower surface of the chute rail.

It is still another object of the present invention to provide apparatus by means of which randomly oriented fasteners on the chute rail are excluded and only properly oriented fasteners can be fed forward.

It is still a further object of the present invention to provide means for excluding improperly oriented fasteners from the chute rail.

In keeping with the principles of the present invention, the above mentioned and other related objects are accomplished by a unique fastener feeding apparatus wherein fasteners stored in a hopper are scooped up by a scooping plate with their head part pointed upward, said scooping plate being tilted as it moves up and reaches it upper limit, where it deposits the fasteners onto a grooved chute rail whose upper surface is kept substantially horizontal, and then the fasteners already arranged in proper orientation on the chute rail can be fed forward by means of vibration imparted to the chute rail and also the fasteners not already disposed on the chute rail in the proper orientation may be caused to return to the hopper by means of an exclusion plate.

BRIEF DESCRIPTION OF THE DRAWINGS

The above mentioned features and objects of the present invention will become more apparent by reference to the following description taken in conjunction with the accompanying drawings wherein like reference numerals denote like elements and in which:

FIG. 8 is an enlarged partial front view of the chute rail;

FIG. 9 is a cross-sectional view of the chute rail taken along the line IX—IX in FIG. 8;

FIG. 10 is an enlarged cross-sectional view illustrating a critical portion of the apparatus shown in FIG. 1;

FIG. 11 is an enlarged plan view thereof;

DETAILED DESCRIPTION OF THE INVENTION

Figure 1:
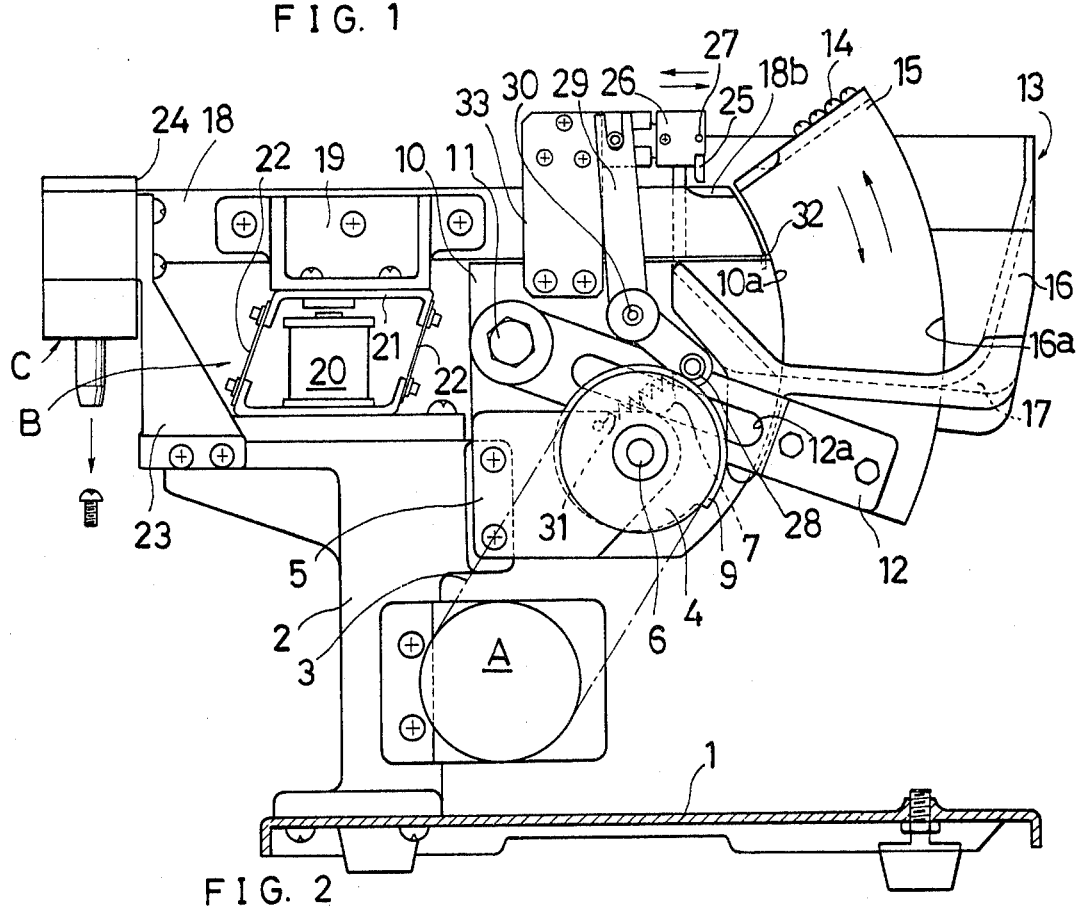
FIG. 1 is a partially cut away front view of the fastener feeding apparatus in accordance with the teachings of the present invention.
Figure 2:
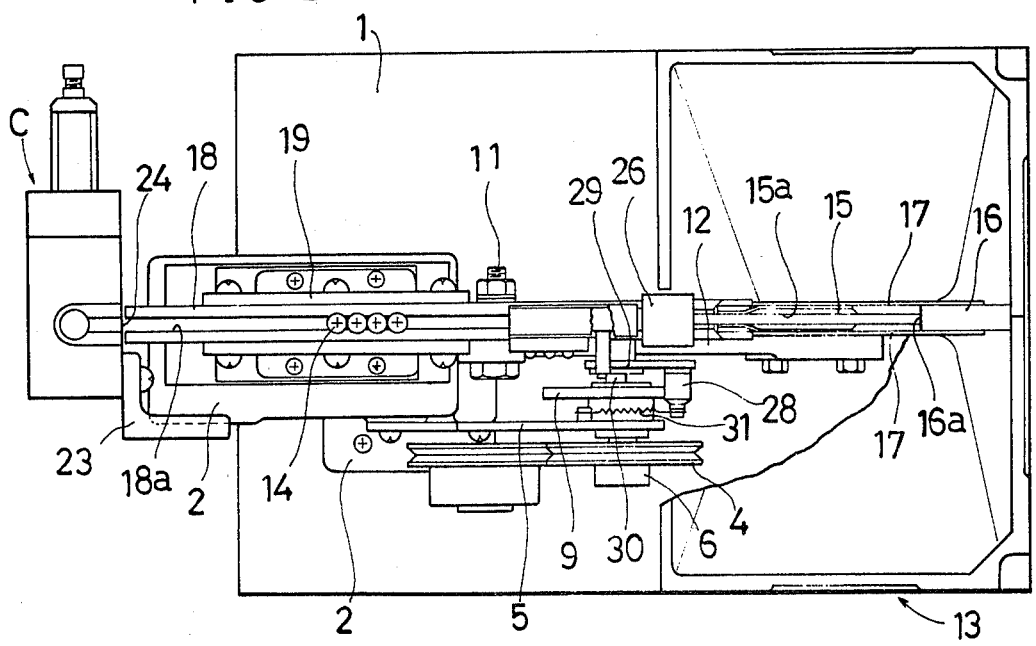
FIG. 2 is a partially cut away plan view thereof.
Figure 3:
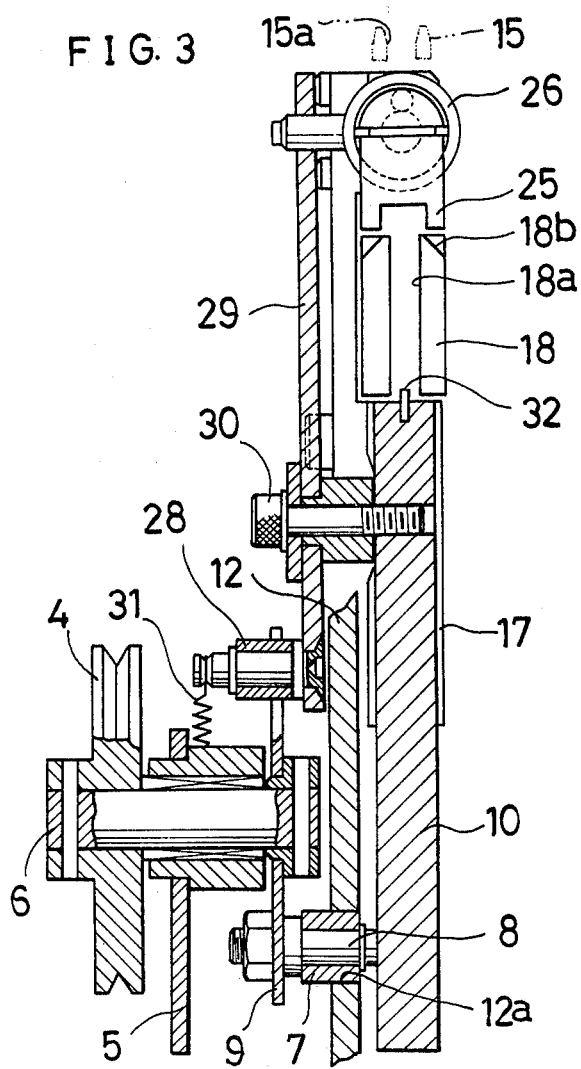
FIG. 3 is an enlarged partially cut away right side view thereof.
Figure 5:
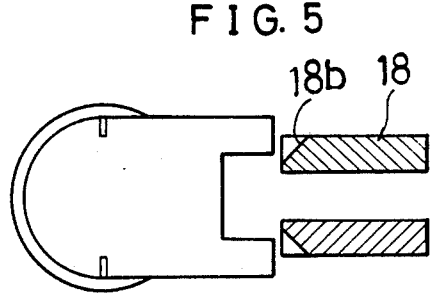
FIG. 5 is a cross-sectional view of the chute rail taken along the line V—V in FIG. 4.
Figure 6:
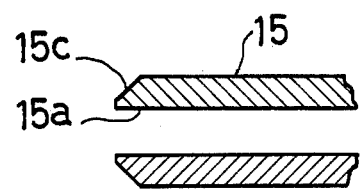
FIG. 6 is a cross-sectional view of the scooping plate taken along the line VI—VI in FIG. 4.
Figure 7:
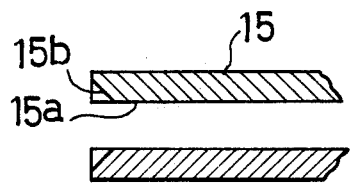
FIG. 7 is a cross-sectional view of the scooping plate taken along the line VII—VII in FIG. 4.

Referring more particularly to the drawings, in FIGS. 1 to 3 reference label A indicates a rotating motive power source which is mounted on a frame 2 fixed in an upright position on a base plate 1. The rotational driving force of motive power source A is transmitted to a pulley 4 by means of a belt 3. The pulley 4 is fixed on one end of a main shaft 6 which is rotatably supported on a bearing plate 5 mounted on the upper part of the frame 2. On the other end of the main shaft 6 is a fixed cam disc 9 which has a cam surface defined by its circumference. A roller shaft 8 is fixed to cam disc 9 for rotatably supporting a guide roller 7. The guide roller 7 is slidably engaged in a guide groove 12a of an arm 12 and moves reciprocally along the guide groove 12a. The arm 12 is pivotally connected at one end to a support plate 10 mounted on the outer part of the frame 2 by a support shaft 11. To the other end of the arm 12 is connected a scoop plate body 15. The scoop plate body 15 has a groove 15a at its upper part for supporting the bottom surface of the head part of screws 14 and for accepting therein the leg part of the screws 14 so that a plurality of screws stored in a hopper 13 mounted on support plate 10 may be scooped up. The scoop plate body 15 is designed so that it can be oscillated up and down about the support shaft 11 of the arm 12. The scoop plate body 15 is in the shape of a segment of a wide annulus centered about the axis of support shaft 11. The inner peripheral surface of the scoop plate body 15 slides along a corresponding circular face 10a of the support plate 10, while the outer peripheral surface of the scoop plate body 15 slides on a slide surface 16a of a bulk head 16 secured to the hopper 13. Moreover, the scoop plate body 15 is guided by a guide plate 17 fixed on support plate 10. In this way the scoop plate body 15 is oscillated by means of a crank mechanism with the main shaft 6 functioning as the crank shaft, cam disc 9 as the crank, and guide roller 7 on roller shaft 8 as the crank pin and is driven by rotating motive power source A via a transmission mechanism.

Figure 4:
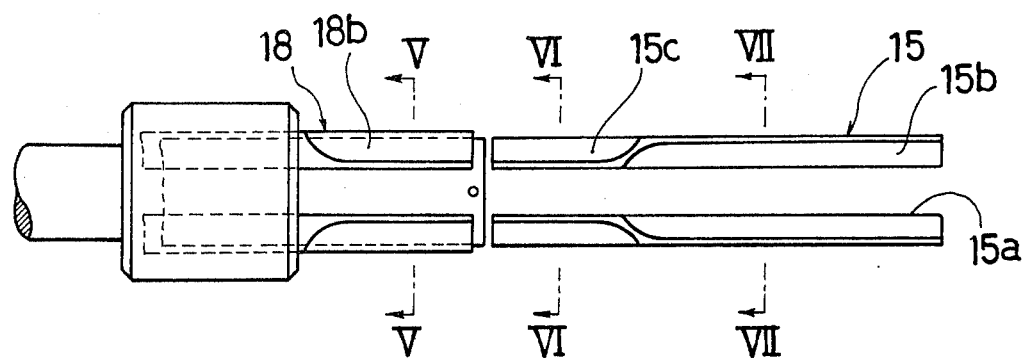
FIG. 4 is an enlarged plan view illustrating the scooping plate body and the chute rail of the apparatus.

Above the support plate 10 there is located a horizontal chute rail 18 having a groove 18a which is sufficiently wide to accept loosely the leg part of screws 14 and permit the leg part to point downward. The rear end of the chute rail 18 extends into the hopper 13 so that the screws 14 which are scooped up by the scoop plate body 15 may be caught thereby as they slide off. As is shown in FIG. 4, the top 18b of said chute rail rear end is beveled so that any improperly oriented screws may drop back into the hopper 13. The chute rail 18 is fixed above a rectilinear vibrator feeding mechanism B mounted on the frame 2 by means of an attachment bracket 19. As shown in FIGS. 8 and 9, attachment bracket 19 is provided with a groove 19a in the longitudinal direction of the chute rail 18, and inside of the groove 19a are formed a pair of steps 19b for supporting the chute rail 18. Rectilinear vibrator feeding unit B is comprised of a solenoid 20 and a vibrating member consisting of a vibrating plate 21 slightly vibrated by said solenoid 20 and two inclined plate springs 22 supporting said vibrating plate 21 at either end. Solenoid 20 and vibrating plate 21 impart a slight vibration to the individual screws 14 which causes them to be fed forward.

On frame 2 there is also attached a mounting bracket 23 for fixing a screw dispensing unit C which dispenses individual screws 14 one by one to an automatic screw driver etc. (not illustrated). A small space is provided between the entrance 24 to dispensing unit C and the forward (output) end of the chute rail 18.

As is shown in FIGS. 4 to 7, the upper surface of the scoop plate body 15 at its far end (the end further from the center of annular segment 15) is in the form of a V-shaped groove to facillitate the scooping up of screws 14, and at its inner end (the end near said center) is beveled in form to let the improperly oriented screws 14 fall back into hopper 13.

In FIG. 10 and FIG. 11, the reference numeral 32 shows an obstacle pin mounted on the upper surface of the support plate 10, above the slide surface 10a upon which the scoop plate body 15 slides reciprocally up and down as aforesaid. Obstacle pin 32 is secured in the middle of the space between the two plates which form the chute rail 18. The top of the obstacle pin 32 is at or above the horizontal plate defined by the bottom surface of the chute rail 18; the rear surface of obstacle pin 32 is located slightly behind the rear lower end of the chute rail 18.

Figure 12:
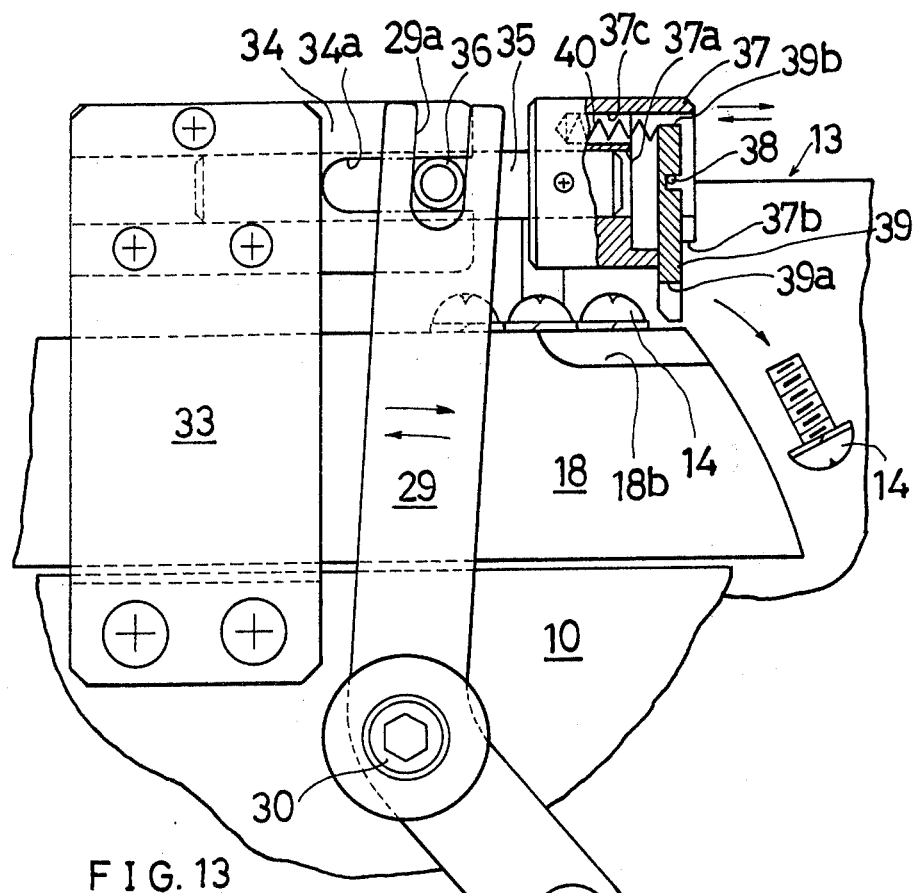
FIG. 12 is an enlarged front view illustrating another critical portion of the apparatus shown in FIG. 1.
Figure 13:
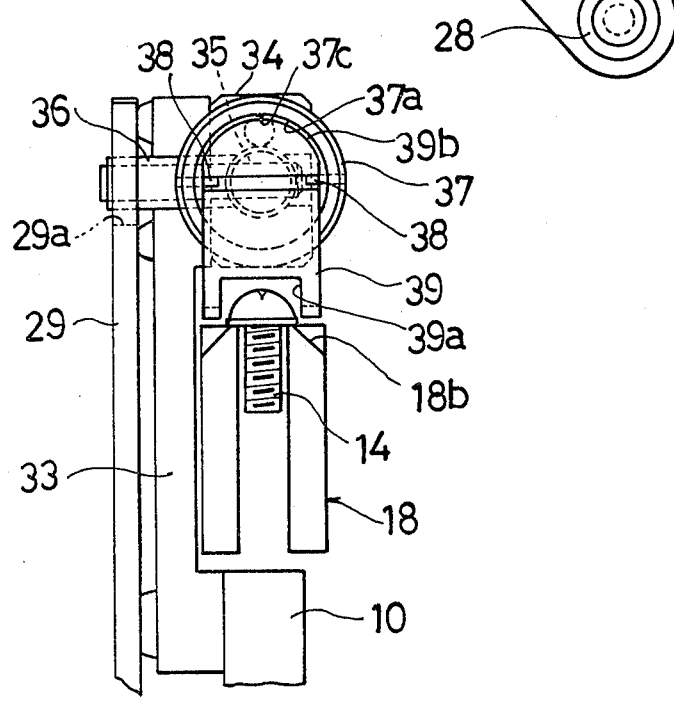
FIG. 13 is a right side view thereof.

As is shown in FIGS. 1 to 3 and also in FIGS. 12 and 13, above the portion of chute rail 18 extending into hopper 13 is mounted in parallel to chute rail 18 a slide shaft 35 that slides back and forth in a guide block 34 fixed to support plate 10 by means of an attachment plate 33. On the slide shaft 35 is mounted a rotating guide roller 36. The guide roller 36 moves horizontally along a long groove 34a provided in the guide block 34 along its center line. The guide roller 36 is slidably engaged with a U-shaped groove 29a provided at the upper end of the lever 29 which pivots about support shaft 30. The lower end of lever 29 is rotatably connected with cam roller 28 which rolls along the cam face 9a of the cam disc 9. The cam face 9a of cam disc 9 is designed so that lever 29 moves quickly as it pivots clockwise about the support shaft 30 but moves slowly as it pivots counter-clockwise. The lever 29 is biased against cam disc 9 by a tension spring 31 so that cam roller 28 is maintained in contact with the cam face 9a of the cam disc 9. The rear end of the slide shaft 35, as is shown in FIGS. 12 and 13, is fixedly inserted into the smaller diameter part of a stepped hole 37a provided in a head block 37. On the inner peripheral surface of the larger diameter of the stepped hole 37a formed in the head block 37 are centrally mounted a pair of horizontally opposed pins 38, 38. An exclusion plate 39 is swingably supported by these pins. Exclusion plate 39 is biased in a clockwise direction (as shown in FIG. 12) by a compression spring 40 contained in a blind hole 37c provided in the upper part of the head block 37, so that the exclusion plate is maintained in contact with the bottom of a groove 37b which is provided in the lower part of head block 37 and in a substantially perpendicular position with respect to chute rail 18. Therefore, the exclusion plate 39 is free to pivot only in a counterclockwise direction against the force of compression spring 40. A slight space is provided between the bottom of exclusion plate 39 and the top of chute rail 18. A notch 39a through which screws 14 can pass is formed at the lower part of exclusion plate 39 facing groove 18a of chute rail 18. The upper end 39b of exclusion plate 39 is in the shape of a circular arc corresponding to the shape of the larger diameter part of the stepped hole 37a.

In operation, when motive force is transmitted by way of the belt 3 to the pulley 4 from the motive power source A, the main shaft 6 is rotated and at the same time the roller shaft 8 fixed to the cam disc 9 is caused to rotate about the main shaft 6. As the guide roller 7 slides within the guide groove 12a of the arm 12, the scoop plate body 15 oscillates up and down along the circular arc face 10a of the support plate 10, and the screws 14 stored in the hopper 13 are thereby scooped up as the scoop plate body 15 moves upward. The upper limit of motion of scoop plate body 15 is predetermined in advance so that its upper surface is inclined with the lower end of the inclined upper surface aligned with the upper surface of the chute rail 18, whereupon the scooped up screws 14 may slide down onto the chute rail 18. The screws 14 thus put on the chute rail 18 are continuously fed in a forward direction along chute rail 18 as the chute rail is vibrated due to the operation of the rectilinear feeding vibrator B. In the above process, when a screw 14 provided with a washer 14a is scooped up by the scoop plate body 15, the screws 14 on the scoop plate body 15 tend to move toward the slide face 10a of the support plate 10 as the upper surface of the scoop plate body 15 inclines and a screw 14 as it rises up will have its washer 14a come in contact with the slide face 10a. When a screw 14 with its washer 14a reaches the space between the chute rail 18 and the support plate 10 as the scoop plate body 15 continues to move up, the washer 14a is prevented from entering that space by the obstacle pin 32 and the screw 14 will continue to rise up smoothly in sliding contact with the rear end of chute rail 18. When the lower (rear) end of the upper surface of the scoop plate body 15 coincides with the upper surface of the chute rail 18, the screw 14 with washer 14a will be able to slide down onto the chute rail 18 where it then may be fed forward in properly oriented fashion.

The slide shaft 35 is moved reciprocally in parallel to the chute rail 18—quickly as it moves toward hopper 13 and slowly as it moves away—due to the interaction of the cam disc 9 and lever 29. The exclusion plate 39 is thereby caused to move along the chute rail 18. Therefore, even if the screws 14 are positioned on chute rail 18 with the head part of the screws 14 piled on top of one another or the screws 14 inclined or overturned, that is to say, if the screws 14 are not properly oriented on the chute rail 18, such disoriented screws 14 will be forced back into the hopper 13, when, as shown in FIG. 12, the exclusion plate 39 retreats towards the rear of the chute rail 18 extending into the hopper 13. Therefore, the remaining screws 14 which are properly oriented on the chute rail 18 are continuously fed into the dispensing unit C by the slight vibration of the chute rail 18 and are then fed one by one to an automatic screw driver or the like (not shown).

Figure 14:
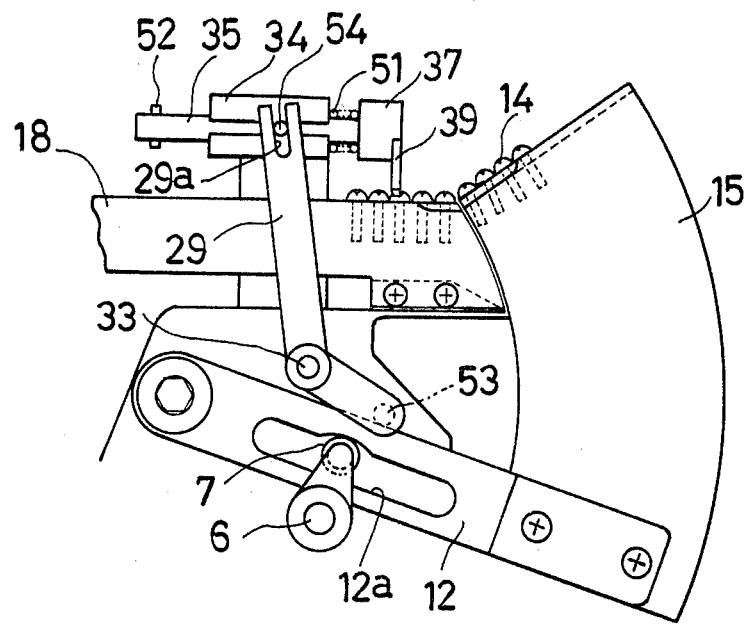
FIG. 14 is a partial front view illustrating a critical portion of a second embodiment in accordance with the teachings of the present invention.

Referring to FIG. 14, shown therein is a second embodiment of a driving means for excluding the improperly oriented fasteners for use in a fastening apparatus in accordance with the teachings of the present invention. In the second embodiment of FIG. 14, the lower end of the lever transmission member 29 is brought into contact with the upper surface of the scoop plate arm 12 by means of a guide shaft 53. The upper end of lever transmission member 29 is slidably engaged at its U-shaped groove 29a with the slide shaft 35 by means of a second guide shaft 54 which projects through the slide shaft 35. A compression spring 51 is provided between the guide block 34 and a head block 37 so that the slide shaft 35 is forced to return to its original position when the lever 29 is not in contact with the scoop plate arm 12. At the end of the slide shaft 35 remote from the head block 37 is provided a stop 52.

In such a second embodiment, a fewer number of exclusion plate driving means parts are required, and also, since a cam means is not employed, the labor required for manufacturing such a cam means can be saved. Moreover, since the lever 29 is in only intermittent contact with the arm 12, a rolling bearing is not required and the apparatus is quite durable and results in the positive exclusion of any disorderly diposed fasteners by means of the exclusion plate 39.

Figure 15:
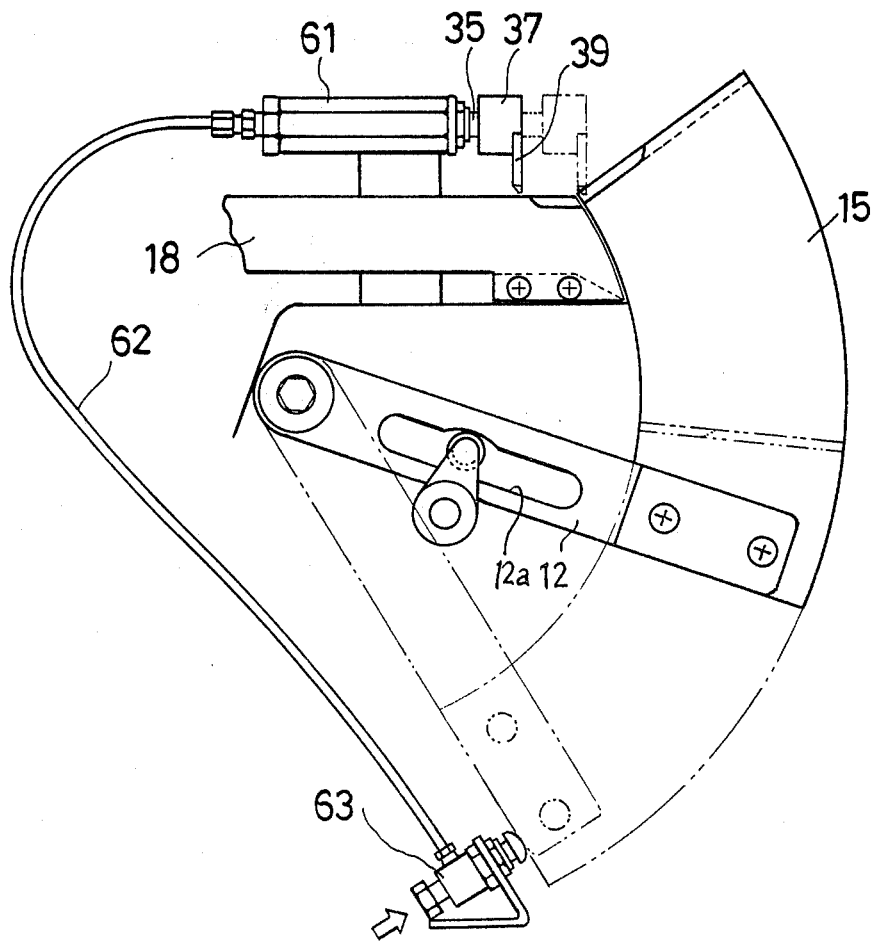
FIG. 15 is a partial front view illustrating a critical portion of a third embodiment in accordance with the teachings of the present invention.

Referring to FIG. 15, shown therein is a third embodiment of a driving means for excluding the improperly oriented fasteners for use in a fastener feeding apparatus in accordance with the teachings of the present invention. In this third embodiment, the exclusion plate 39 is substantially the same in function as the previously described embodiments, except that it is put in motion by a piston cylinder mechanism 61. A single acting piston cylinder mechanism 61 containing a return spring (not shown) is connected to the slide shaft 35. Into this piston cylinder mechanism 61 is fed air from a valve 63 via a hose 62. The valve 63 is opened to feed air when it is depressed by the scoop plate arm 12 moving down and reaching its lower limit of motion; it is closed when said arm 12 moves up out of contact with the valve 63. Thus, air is fed periodically to the piston cylinder mechanism 61 by way of the hose 62.

Accordingly, when air is fed into the piston cylinder mechanism 61, the piston is forced to advance against the force of the return spring installed in the cylinder and pushes back the exclusion plate 39 thereby returning any disorderly disposed fasteners 14 into the hopper 13. When the valve 63 is closed, the air in the piston cylinder mechanism 61 escapes and the compression spring in the cylinder expands, thereby returning the piston and exclusion plate to their original position.

The embodiment of FIG. 15 has the advantage over embodiments of requiring fewer parts than the above described mechanical linkage systems and of being easier to manufacture. Furthermore, since there are no parts in metallic contact with one another, abrasion problems are eliminated resulting in an elongated life for the apparatus.

As may be seen from the above description, a fastener feeding in accordance with this invention has numerous advantages over conventional fastener feeding apparatus including the following: The head parts and leg parts of the fasteners do not overlap each other, therefore, the orderly feeding of fasteners is facillitated. The fastener dispensing unit can be mounted substantially in horizontal alignment with the forward end of the chute rail, therefore, the fasteners can be reliably advanced and fed into said unit one by one with their leg parts pointing downward without overlapping the head part and the operation of the dispensing unit may proceed without any blockage. Further, the feeding apparatus of this invention can feed both long shank and short shank fasteners and can also feed fasteners with or without washers on them. In short, the apparatus has broad applicability to feed different types of fasteners. The chute rail is slightly vibrated all of the time, therefore, the fasteners can be fed in an orderly without any obstruction caused by dust, oil or the like. The fasteners are prevented by the obstacle pin from being jammed into the space between the bottom surface of the chute rail and the upper surface of the support plate. Moreover, in contrast to the conventional type of fastener feeding apparatus in which the fasteners are scooped up by a barrel, in the apparatus in accordance with the teachings of the present invention, the fasteners are not scratched nor is their coating removed. The outward portion of the top surface of the scoop plate body is shaped as a V-groove so as to facilitate fastener scooping. The inward portion of the top surface of the scoop plate body is bevelled in form so that the improperly oriented fasteners may drop into the hopper. As a result, one pivotal motion of the scoop plate body scoops up many fasteners, resulting in a high rate of fastener feeding. Most of the improperly oriented fasteners such as fallen down fasteners drop into the hopper as they move from the scoop plate to the chute rail; therefore, the improperly oriented fasteners are prevented from being fed into the chute rail. Disorderly disposed fasteners are positively returned to the hopper from the chute rail and the fasteners are prevented from being damaged. Since the exclusion plate is caused to pivot against the force of a spring when a resistance is encountered by its lower end as a result of one or more improperly oriented fasteners when the exclusion plate moves away from the hopper, the mechanism of the apparatus is not damaged even if a fastener is jammed in place in the vicinity of the chute rail, the hopper and the exclusion plate.

In all cases, it is understood that the above described embodiments are merely illustrative of but of a few of the many possible specific embodiments which represent the applications of the principles of the present invention. Numerous and varied other arrangements can be readily devised by those skilled in the art without departing from the spirit and the scope of the present invention.

What is claimed is:

1. A fastener feeding apparatus for scooping up fasteners stored in bulk form in a hopper, orienting them in a predetermined position, and sequentially feeding them, comprising:
    a movable scooping plate adapted to scoop up fasteners in a predetermined position with the fastener head facing upward and the fastener leg extending downward in a groove provided in the top surface of said scooping plate, said top surface being inclined when said scooping plate is at an upper position so that said fasteners supported in said predetermined position may slide down by gravity to the rear of said inclined top surface, said top surface of said scooping plate is in the form of a V-shaped groove at its outer end for facilitating the scooping up of said fasteners and is beveled at its inner end for facilitating the return back to said hopper of fasteners not supported in said predetermined position, said scooping plate comprising;
    a scoop plate body; and
    a scoop plate arm coupled to said scoop body, said scoop plate arm being supported pivotally on a vertically extending support plate extending at least partially into said hopper with a side end surface of said support plate defining a circular segment conforming to an inner peripheral face of said scoop plate body;
    motive means for moving said scooping plate from said upper position to a lower position and vice versa;
    a chute rail having a substantially horizontal fastener supporting face adapted to receive said fasteners supported on said scooping plate as they slide down from said scooping plate top surface and to support said fasteners by the bottom face of the head part with their heads facing upwardly and their legs loosely inserted in a chute rail groove, a bottom face of said chute rail having a top surface of said support plate extending upwardly towards said bottom face, said chute rail further being spaced from said support plate by a slight clearance space for permitting vibration of said chute rail, the rear end faces of said chute rail being in the form of a circular segment conforming to said inner peripheral surface of said scoop plate body and is spaced therefrom by a slight clearance for permitting vibration of said chute rail relative to said scoop plate body; and
    a chute rail support for supporting said chute rail in a substantially horizontal position, said chute rail support comprising a rectilinear vibrating unit for imparting a slight vibration to said chute rail and for thereby causing the fasteners supported by said chute rail to be fed in a rearward direction.

2. A fastener feeding apparatus as claimed in claim 1, wherein an obstacle member extends from said support plate top surface in the vicinity of said chute rail rear end face thereby preventing fasteners scooped up by said scoop plate body from entering said clearance space between said chute rail bottom surface and said support plate top surface.

3. A fastener feeding apparatus as claimed in claim 2, wherein the top of said obstacle member is at or above the horizontal plane defined by said bottom surface of said chute rail.

4. A fastener feeding apparatus as claimed in claims 2 or 3, wherein a rear surface of said obstacle member is located to the rear of said rear end face of said chute rail.

5. A fastener feeding apparatus for the sequential feeding of fasteners arranged in a predetermined position comprising:
    a chute rail adapted to support said fasteners by the bottom face of their head part with their heads facing upward and their legs facing downward, said legs being loosely inserted in a groove provided in said chute rail;
    a guide block mounted above said chute rail;
    a slide shaft supported by said guide block and movable reciprocally therein in a longitudinal direction parallel to the longitudinal axis of said chute rail;
    a rotating cam having a cam surface defined by its outer circumference, said cam surface being asymmetrical such that said slide shaft moves at a greater velocity in a rearward direction then in a forward direction;

a transmission member comprising a lever mounted in a position where one end may make contact with said cam surface, the other end thereof being in mechanical engagement with said slide shaft;

a spring member for biasing said one end of said lever in contact with said cam surface; and an exclusion member attached at one end of said slide shaft and movable reciprocally therewith for removing improperly oriented fasteners from said chute rail, said exclusion member comprising an exclusion plate extending toward said top surface of said chute rail and holding means for holding said exclusion plate elastically in a reciprocal moving direction.

6. A fastener feeding apparatus as claimed by claim 5, wherein said holding means comprises:

a head block movable along said chute rail and spaced therefrom;

a pin mounted on said head block for supporting said exclusion plate swingably about an axis perpendicular to said longitudinal direction; and an elastic member connected to said head block and to said exclusion plate for biasing said exclusion plate in said operative position.

7. A fastener feeding apparatus as claimed in claim 6, wherein said elastic member is a compression spring accommodated in said head block.

8. A fastener feeding apparatus for sequential feeding of fasteners arranged in a predetermined position comprising:

a chute rail adapted to support said fasteners by the bottom face of their head part with their heads facing upward and their legs facing downward, said legs being loosely inserted in a groove provided in said chute rail;

a guide block mounted above said chute rail;

a slide shaft supported by said guide block and movable reciprocally therein in a longitudinal direction parallel to the longitudinal axis of said chute rail;

a swing arm supported a fixed shaft;

a transmission member comprising a lever mounted in a position where one end thereof may make intermittent contact with said swing arm, the other end thereof being in mechanical engagement with said slide shaft;

a spring for returning said slide shaft to a rest position when said transmission member lever moves out of contact with said swinging arm;

a mechanical stop for stopping the further return motion of said slide shaft when said slide shaft has returned to said rest position; and an exclusion member attached at one end of said slide shaft and movable reciprocally therewith for removing improperly oriented fasteners from said chute rail.

9. A fastener feeding apparatus as claimed in claim 8, wherein said transmission member further comprises:

a shaft for rotatably supporting said lever; and a guide shaft mounted to one side of said slide shaft so as to engage a U-shaped groove provided at said other end of said lever.

10. A fastener feeding apparatus as claimed in claims 8 or 9, wherein said spring for returning said slide shaft is a compression coil spring fitted on said slide shaft between said head block and said guide block, and wherein said slide shaft stop is attached to said slide shaft at the end thereof remote from said guide block.

11. A fastener feeding apparatus for scooping up fasteners stored in bulk form in a hopper, orienting them in a predetermined position, and sequentially feeding them, comprising:

a movable scooping plate adapted to scoop up fasteners from the bottom of said hopper and support the scooped up fasteners in a predetermined position with the fastener head facing upward and the fastener leg extending downward in a groove provided in the top surface of said scooping plate, said top surface being inclined when said scooping plate is at an upper position so that said fasteners supported in said predetermined position may slide down by gravity to the rear of said inclined top surface;

said scoop plate is supported pivotally on a vertically extending support plate extending at least partially into said hopper with a side end surface of said support plate defining a circular segment conforming to an inner peripheral face of said scoop plate and a top surface of said support plate extending upward toward a bottom face of said chute rail and spaced therefrom by a slight clearance space for permitting vibration of said chute rail and wherein the rear end face of said chute raii is in the form of a circular segment conforming to said inner peripheral surface of said scoop plate and is spaced therefrom by a slight clearance space for permitting vibration of said chute rail relative to said scoop plate;

motive means for moving said scooping plate from said upper position to a lower position and vice versa;

a chute rail having a substantially horizontal fastener supporting face adapted to receive said fasteners supported on said scooping plate as they slide down from said scooping plate top surface and to support said fasteners by the bottom face of the head part with their heads facing upward and their legs loosely inserted in a chute rail groove;

a chute rail support for supporting said chute rail in a substantially horizontal position, said chute rail support comprising a rectilinear vibrating unit for imparting a slight vibration to said chute rail and for thereby causing the fasteners supported by said chute rail to be fed in a rearward direction;

a guide block mounted above said chute rail;

a slide shaft supported by said guide block and movable reciprocally therein in a longitudinal direction parallel to the longitudinal axis of said chute rail;

a fluid piston cylinder mechanism connected to said slide shaft;

a periodically operated valve for periodically feeding fluid to said fluid piston cylinder mechanism; and an exclusion member attached at one end of said slide shaft and movable reciprocally therewith for removing improperly oriented fasteners from said chute rail.

* * * * *